United States Patent
Brummel et al.

(10) Patent No.: US 10,018,070 B2
(45) Date of Patent: Jul. 10, 2018

(54) METHOD FOR OPERATING A TURBOMACHINE, WHEREIN AN EFFICIENCY CHARACTERISTIC VALUE OF A STAGE IS DETERMINED, AND TURBOMACHINE HAVING A DEVICE FOR CARRYING OUT THE METHOD

(71) Applicant: SIEMENS AKTIENGESELLSCHAFT, München (DE)

(72) Inventors: Hans-Gerd Brummel, Berlin (DE); Dirk Grieshaber, Wesel (DE); Uwe Pfeifer, Berlin (DE); Huub De Bruyn, Da Borne (NL)

(73) Assignee: SIEMENS AKTIENGESELLSCHAFT (DE)

( * ) Notice: Subject to any disclaimer, the term of this patent is extended or adjusted under 35 U.S.C. 154(b) by 365 days.

(21) Appl. No.: 14/904,841

(22) PCT Filed: Sep. 5, 2014

(86) PCT No.: PCT/EP2014/068903
§ 371 (c)(1),
(2) Date: Jan. 13, 2016

(87) PCT Pub. No.: WO2015/043916
PCT Pub. Date: Apr. 2, 2015

(65) Prior Publication Data
US 2016/0138418 A1 May 19, 2016

(30) Foreign Application Priority Data

Sep. 30, 2013 (DE) .................. 10 2013 219 749

(51) Int. Cl.
*F01D 17/00* (2006.01)
*F01D 21/00* (2006.01)
(Continued)

(52) U.S. Cl.
CPC ............ *F01D 21/003* (2013.01); *F01D 5/02* (2013.01); *F01D 15/08* (2013.01); *F01D 17/02* (2013.01);
(Continued)

(58) Field of Classification Search
CPC ...... F01D 17/02; F01D 17/06; F04D 15/0066; F04D 27/004; F05D 2270/52
See application file for complete search history.

(56) References Cited

U.S. PATENT DOCUMENTS

| 6,600,240 B2 * | 7/2003 | Mikhail ............... F03D 7/0224 307/85 |
| 8,219,257 B2 * | 7/2012 | Hunt ...................... B63B 21/50 290/42 |

(Continued)

FOREIGN PATENT DOCUMENTS

| DE | 102 21 594 A1 | 11/2003 |
| DE | 10221594 A1 | 11/2003 |

(Continued)

OTHER PUBLICATIONS

International Search Report for PCT/EP2014/068903, dated Dec. 16, 2014.

*Primary Examiner* — Ninh H Nguyen
(74) *Attorney, Agent, or Firm* — Schmeiser Olsen & Watts LLP

(57) ABSTRACT

A turbo-machine, which can be operated in an optimized driving range is provided. To this end, a method for operating a turbo-machine having at least one turbo-machine stage, which has at least one rotary shaft is disclosed. According to the method, the following method steps are carried out: a) determining a desired efficiency characteristic value $\eta_{soll}$ of the turbomachine stage; b) determining an actual efficiency characteristic value $\eta_{ist}$ of the turbo-machine-stage; c) determining a comparison efficiency charac- (Continued)

teristic value of the turbo-machine stage by comparing the actual efficiency characteristic value $\eta_{ist}$ and the desired efficiency characteristic value $\eta_{soll}$ to one another; and d) changing at least one operating parameter of the turbo-machine stage subject to the comparison efficiency characteristic value $\eta_{vgl}$, wherein in order to determine the actual efficiency characteristic value $\eta_{ist}$, a measuring of a torque of the rotary shaft of the turbo-machine-stage is carried out.

15 Claims, 2 Drawing Sheets

(51) Int. Cl.
| | |
|---|---|
| *F01D 17/02* | (2006.01) |
| *F01D 15/08* | (2006.01) |
| *F04D 25/04* | (2006.01) |
| *F04D 27/00* | (2006.01) |
| *G01L 3/10* | (2006.01) |
| *F01D 5/02* | (2006.01) |
| *F03B 3/12* | (2006.01) |
| *F03B 15/00* | (2006.01) |
| *F04D 15/00* | (2006.01) |
| *F04D 29/18* | (2006.01) |
| *F04D 29/32* | (2006.01) |

(52) U.S. Cl.
CPC ............... *F03B 3/12* (2013.01); *F03B 15/00* (2013.01); *F04D 15/0066* (2013.01); *F04D 25/045* (2013.01); *F04D 27/001* (2013.01); *F04D 27/004* (2013.01); *F04D 29/181* (2013.01); *F04D 29/321* (2013.01); *G01L 3/102* (2013.01); *F05D 2220/31* (2013.01); *F05D 2220/32* (2013.01); *F05D 2220/40* (2013.01); *F05D 2270/335* (2013.01); *F05D 2270/52* (2013.01); *F05D 2270/804* (2013.01)

(56) References Cited

U.S. PATENT DOCUMENTS

| | | | |
|---|---|---|---|
| 8,636,613 B2 * | 1/2014 | Teslak | B60W 10/02 475/125 |
| 2004/0064292 A1 | 4/2004 | Beck | |
| 2013/0026758 A1 * | 1/2013 | Moretti | F03D 7/046 290/44 |

FOREIGN PATENT DOCUMENTS

| | | |
|---|---|---|
| DE | 195 49 659 B2 | 12/2004 |
| DE | 19549659 B4 | 12/2004 |
| DE | 10 2011 075400 A1 | 11/2012 |
| DE | 102011075400 A1 | 11/2012 |
| JP | S55 60694 A | 5/1980 |
| JP | S5560694 A | 5/1980 |
| WO | WO 2012152515 A1 | 11/2012 |

* cited by examiner

METHOD FOR OPERATING A TURBOMACHINE, WHEREIN AN EFFICIENCY CHARACTERISTIC VALUE OF A STAGE IS DETERMINED, AND TURBOMACHINE HAVING A DEVICE FOR CARRYING OUT THE METHOD

CROSS-REFERENCE TO RELATED APPLICATIONS

This application claims priority to PCT Application No. PCT/EP2014/068903, having a filing date of Sep. 5, 2014, based off of German Application No. DE 102013219749.7 having a filing date of Sep. 30, 2013, the entire contents of which are hereby incorporated by reference.

FIELD OF TECHNOLOGY

The following relates to a method for operating a turbomachine comprising at least one turbomachine stage with at least one rotary shaft, and to a turbomachine comprising a device for carrying out the method.

BACKGROUND

By way of example, the turbomachine is a turbocompressor or a hydroturbine. In a turbomachine, energy is transmitted by a flowing fluid (gas or liquid). The energy transmission is carried out in this case by way of a rotor with rotary shaft. Rotor blades, wings or blades, which are formed in such a way that a pressure difference ($\Delta p$) emerges in the fluid flow (volumetric flow) between the front side and rear side of the rotor, are arranged at the rotary shaft (driveshaft or output shaft).

The power and power intake or power output of the turbomachine (or of individual turbomachine stages) are established over a plurality of measured process parameters (operating parameters). Here, problems are caused by the measurement accuracy of employed instruments for measuring the process parameters and the frequent lack of knowledge about a gas composition or the lack of knowledge about further operating parameters. Often, the measurement has to be carried out at a constant load over a relatively long period of time in this case. What results from this is that the turbomachine can very often not be driven in the ideal efficiency range.

SUMMARY

An aspect relates to a turbomachine can be flexibly operated in an ideal operating range.

A further aspect relates to a method for operating a turbomachine comprising at least one turbomachine stage with at least one rotary shaft is specified. In accordance with the method, the following method steps are carried out:
a) determining a desired efficiency characteristic value $\eta_{soll}$ of the turbomachine stage,
b) establishing an actual efficiency characteristic value $\eta_{ist}$ of the turbomachine stage,
c) establishing a comparison efficiency characteristic value of the turbomachine stage by comparing the actual efficiency characteristic value $\eta_{ist}$ and the desired efficiency characteristic value $\eta_{soll}$ to one another and
d) modifying at least one operating parameter of the turbomachine stage in a manner dependent on the comparison efficiency characteristic value $\eta_{vgl}$, wherein a torque of the rotary shaft of the turbomachine stage is measured for establishing the actual efficiency characteristic value $\eta_{ist}$. The torque at the rotary shaft is measured.

An aspect relates to a turbomachine comprising at least one turbomachine stage with at least one rotary shaft is also specified, wherein the turbomachine has a device for carrying out the method. By way of example, the turbomachine is a turbocompressor which has a plurality of compressor stages (turbomachine stages).

Embodiments of the invention include measuring torques applied to the rotary shaft of the turbomachine stage during operation of the turbomachine. The actual efficiency $\eta_{ist}$ (actual efficiency characteristic value) of the turbomachine stage of the turbomachine is deduced from the measured torques.

The current actual efficiency characteristic value $\eta_{ist}$ of the turbomachine stage is compared to the desired efficiency characteristic value $\eta_{soll}$ of the turbomachine stage. The desired efficiency characteristic value $\eta_{soll}$ is e.g. established for the respective turbomachine stage after the completion thereof or established separately after completion of the turbomachine. The use of a predetermined, standardized desired efficiency characteristic value $\eta_{soll}$ (standard) is also conceivable.

The comparison efficiency characteristic value $\eta_{vgl}$ emerges from comparing the actual efficiency characteristic value $\eta_{ist}$ and the desired efficiency characteristic value $\eta_{soll}$ to one another. There is closed-loop control of at least one operating parameter (process parameter) of the turbomachine stage on the basis of the comparison efficiency characteristic value $\eta_{vgl}$. In particular, the operating parameter is an extent of the volumetric flow rate of the fluid at the turbomachine stage or a rotational speed, with which the rotary shaft of the turbomachine stage is driven. Using embodiments of the invention, the turbomachine stage is optimized during operation.

The method can be applied to a single-stage turbomachine. The turbomachine comprises only one turbomachine stage.

In a particular embodiment, a multistage turbomachine comprising at least one further turbomachine stage with at least one further rotary shaft is used as a turbomachine. The turbomachine comprises at least one further turbomachine stage with at least one further rotary shaft. Here, for example, the rotary shaft and the further rotary shaft are identical. There is merely one common rotary shaft of the turbomachine stages. By way of example, such a multistage turbomachine is a multistage turbocompressor.

Preferably, the following further method steps are carried out:
a') determining a further desired efficiency characteristic value $\eta_{soll}'$ of the further turbomachine stage,
b') establishing a further actual efficiency characteristic value $\eta_{vgl}'$ of the further turbomachine stage,
c') establishing a further comparison efficiency characteristic value $\eta_{vgl}'$ of the further turbomachine stage by comparing the further actual efficiency characteristic value $\eta_{ist}'$ and the further desired efficiency characteristic value $\eta_{soll}'$ to one another and
d') modifying at least one further operating parameter of the further turbomachine stage in a manner dependent on the further comparison efficiency characteristic value $\eta_{vgl}'$.

Here, in particular, a further measurement of a further torque of the further rotary shaft of the further turbomachine stage is carried out for establishing the further actual efficiency characteristic value $\eta_{ist}'$. A further torque at the further rotary shaft is measured.

In the case of a multistage turbomachine, the method for establishing the comparison efficiency characteristic value is carried out for a plurality of turbomachine stages. This is preferably carried out independently of one another and/or separately for each one of the turbomachine stages. Respective operating parameters of the respective turbomachine stage are varied or adapted on the basis of the respectively established comparison efficiency characteristic values. Overall, this results in a turbomachine which can be operated in the ideal operating range with an optimized overall efficiency.

For the purposes of the individual, independent establishment of the comparison efficiencies, a torque sensor is arranged at the rotary shaft for establishing the actual efficiency characteristic value $\eta_{ist}$ of the turbomachine stage and/or a further torque sensor is arranged at the further rotary shaft for establishing the further actual efficiency characteristic value $\eta_{ist}'$ of the turbomachine stage.

Preferably, a contactless measurement method is carried out for measuring the torque of the rotary shaft and/or for measuring the further torque of the further rotary shaft. The torque sensor and/or the further torque sensor is/are a contactless torque sensor.

By way of example, an optical measurement method is carried out as a contactless measurement method. Preferably, the contactless measurement method is carried out with the aid of a magnetoelastic torque sensor. The contactless torque sensor is a magnetoelastic torque sensor. A magnetoelastic torque sensor is preferably arranged directly at the respective rotary shaft.

Magnetoelasticity is based on a change in the magnetic permeability of a ferroelectric material due to mechanical forces acting on the ferromagnetic material. By using magnetoelastic torque sensors, it is possible to measure torques directly during operation of the turbomachine and to establish a corresponding efficiency characteristic value of the respective turbomachine stage of the turbomachine therefrom.

In view of the magnetoelastic measurement principle, it is particularly advantageous to use a the rotary shaft of the turbomachine stage consisting completely of ferroelectric material. However, it is also conceivable for the rotary shaft to merely consist in part of ferroelectric material. By way of example, a ferroelectric coating of the rotary shaft, which is securely connected to the rotary shaft, consists of ferroelectric material. What is ensured hereby is that, by connecting the ferroelectric coating and the rotary shaft, the torque of the rotary shaft can be transmitted to the ferroelectric coating. The permeability of the ferroelectric coating changes by the transmission of the torque. This results in a detectable signal which allows conclusions to be drawn in relation to the torque applied to the rotary shaft.

In accordance with a particular embodiment, the turbomachine is selected from the group containing gas turbine, steam turbine, turbocharger, pump, compressor and hydro-turbine. The turbomachine is preferably a compressor, in particular a turbocompressor. Here, turbocompressors are understood to mean both mechanically driven compressors in the oil and gas sector and combined machines for energy conversion, such as gas turbines.

Preferably, an actual efficiency characteristic value $\eta_{ist}$ and/or a further actual efficiency characteristic value $\eta_{ist}'$ is/are used, which emerge from the following equation:

$$\eta_i = P1_i/P2_i \qquad (1).$$

Here, $\eta_i$ is the respective efficiency characteristic value of the turbomachine stage. $P1_i$ is the product of the volumetric flow rate through the respective turbomachine stage i and the pressure difference $\eta_i$ at the turbomachine stage i. $P2_i$ is the product of the torque at the rotary shaft of the respective turbomachine stage i and the rotational speed of the rotary shaft of the turbomachine stage i.

Various variables are conceivable as operating parameters of the turbomachine. In a particular embodiment, a volumetric flow rate of the fluid at the turbomachine stage, with which fluid the turbomachine stage is operated, and/or a rotational speed, with which the rotary shaft of the turbomachine stage is driven, is/are used as operating parameter and/or as further operating parameter. These operating parameters are modified in a manner dependent on the comparison efficiency characteristic value $\eta_{vgl}$. By way of example, a further operating parameter is a position of valves and baffle plates for the fluid, with which the turbomachine stage is operated.

BRIEF DESCRIPTION

Some of the embodiments will be described in detail, with reference to the following figures, wherein like designations denote like members, wherein.

DETAILED DESCRIPTION

Figure 1:
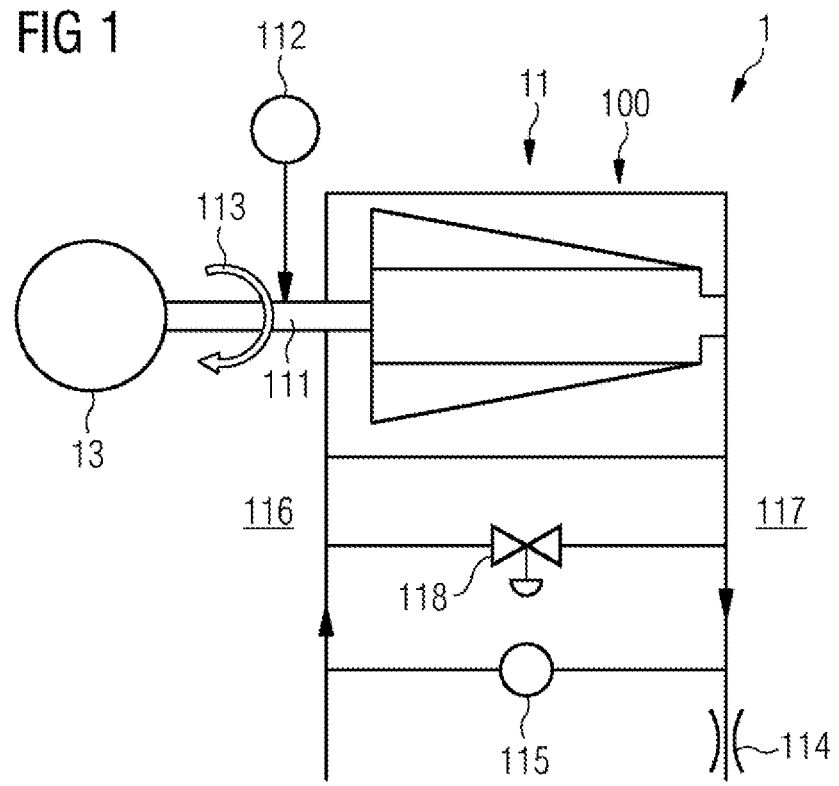
FIG. 1 shows an embodiment of a single-stage, single-shaft compressor.

What is shown is a turbomachine 1 in the form of a turbocompressor with at least one compressor stage (turbomachine stage) 11. The compressor stage 11 has a rotary shaft 111.

A torque sensor 112 for establishing the actual efficiency characteristic value $\eta_{ist}$ of the compressor stage 11 is arranged at the rotary shaft 111. The torque sensor 112 is a magnetoelastic torque sensor.

The turbocompressor 1 has a device 100 for carrying out an operating method comprising the following method steps:

a) determining the desired efficiency characteristic value $\eta_{soll}$ of the compressor stage 11, b) establishing the actual efficiency characteristic value $\eta_{ist}$ of the compressor stage 11, c) establishing the comparison efficiency characteristic value $\eta_{vgl}$ of the compressor stage 11 by comparing the actual efficiency characteristic value $\eta_{ist}$ and the desired efficiency characteristic value $\eta_{soll}$ to one another and d) modifying at least one operating parameter of the compressor stage 11 in a manner dependent on the comparison efficiency characteristic value $\eta_{vgl}$.

A torque of the rotary shaft 111 of the compressor stage 11 is measured with the aid of the magnetoelastic torque sensor 112 for establishing the actual efficiency characteristic value $\eta_{ist}$. To this end, the rotary shaft 111 consists of ferroelectric material. In an alternative exemplary embodiment, the rotary shaft 111 has a ferroelectric coating securely connected to the rotary shaft 111.

The actual efficiency characteristic value $\eta_{ist}$ of the compressor stage 11 is established according to equation (1). Likewise, the desired efficiency characteristic value $\eta_{soll}$ is determined more or less directly after completion of the turbocompressor 1.

The volumetric flow rate across the compressor stage 11, to be measured for P1 (according to equation (1)), is measured with the aid of a volumetric flow rate metering orifice 114.

Furthermore, the pressure difference ηp 115 between the front side 116 and rear side 117 of the compressor stage 11, which is required for P1, is measured.

The torque at the rotary shaft 111 is measured for P2 (according to equation (1) as described above. The rotational speed 113 of the rotary shaft 111 of the compressor stage 11 is known in each case.

The of the comparison efficiency characteristic value $\eta_{vgl}$ of the compressor stage 11 emerges from the comparison between the actual efficiency characteristic value $\eta_{ist}$ and the desired efficiency characteristic value $\eta_{soll}$.

At least one operating parameter of the compressor stage 11 is varied in a manner dependent on the comparison efficiency characteristic value $\eta_{vgl}$. To this end, use is made of pump regulation 118. The operating parameter is the rotational speed 115 of the rotary shaft 111, which is modifiable by way of the actuation of the motor 13, and/or the volumetric flow rate of the fluid, which is modifiable by way of the volumetric flow rate metering orifice.

Example 1

The turbocompressor 1 is an (axially or radially operated) single-shaft compressor (compressor with only one rotary shaft, FIG. 1).

Example 2

Figure 2:
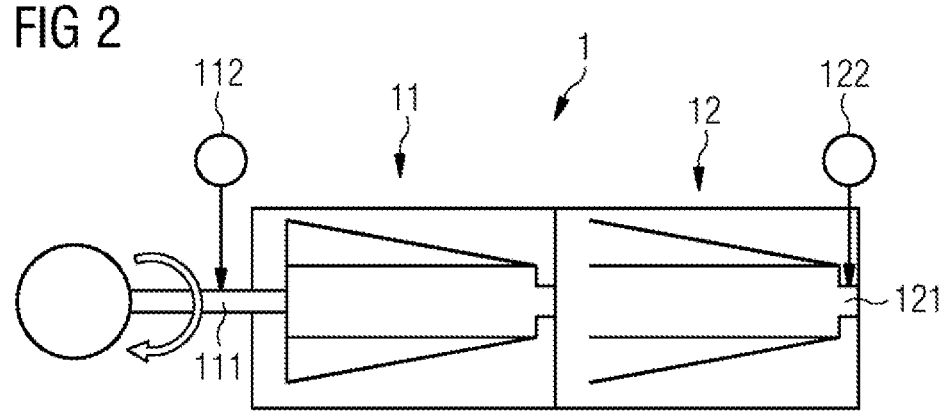
FIG. 2 shows an embodiment of a multistage, single-shaft compressor.

In contrast to example 1, the turbocompressor 1 is a multistage, single-shaft compressor (FIG. 2). The turbocompressor 1 comprises a turbocompressor stage 11 and at least one further turbocompressor stage 12.

The rotary shaft 111 of the compressor stage 11 and the further rotary shaft 121 of the further compressor stage 12 form a common rotary shaft.

A further magnetoelastic torque sensor 122 is arranged at the further compressor stage 12. The further torque is picked off in the region of the further rotary shaft 121 with the aid of the further torque sensor 122.

The torque sensor 112 and the further torque sensor 122 are operated independently of one another. The travel range optimization for the further compressor stage 12 is carried out in a manner corresponding to the above-described travel range optimization for the compressor stage 11.

Example 3

Figure 3:
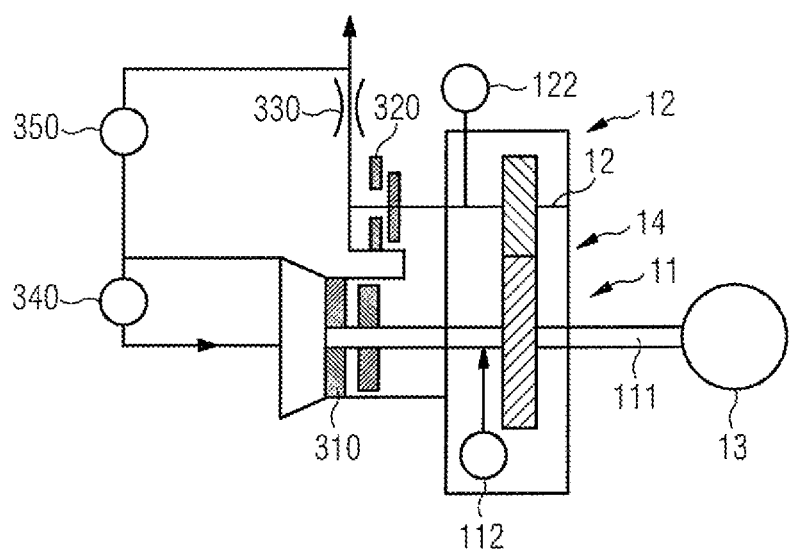
FIG. 3 shows an embodiment of a geared compressor.

The turbocompressor 1 is a geared compressor (FIG. 3). The compressor stage 11 and the further compressor stage 12 are connected to one another by way of a gearing mechanism 14. The rotary shaft 111 is driven by way of the motor 13. The further rotary shaft 12 is coupled to the rotary shaft 111 by way of the gearing mechanism 14.

The torque of the rotary shaft 11 is measured by way of the torque sensor 112 and the further torque of the further rotary shaft 12 is measured by way of the further torque sensor 122.

The fluid to be compressed is introduced into the geared compressor and the compressed fluid is removed from the geared compressor by way of the adjustable input control apparatus (ELA) 310 and the adjustable output control apparatus (ALA) 320, respectively.

Further constituents are, once again, a volumetric flow rate metering orifice 330 and devices for measuring the pressure differences 340 and 350 at the individual compressor stages 11 and 12.

The invention claimed is:

1. A method for operating a turbomachine including at least one turbomachine stage with at least one rotary shaft, the method comprising:
   a) determining a desired efficiency characteristic value $\eta_{soll}$ of the at least one turbomachine stage;
   b) establishing an actual efficiency characteristic value $\eta_{ist}$ of the at least one turbomachine stage;
   c) establishing a comparison efficiency characteristic value $\eta_{vgl}$ of the at least one turbomachine stage by comparing the actual efficiency characteristic value $\eta_{ist}$ and the desired efficiency characteristic value $\eta_{soll}$ to one another; and
   d) modifying at least one operating parameter of the at least one turbomachine stage in a manner dependent on the comparison efficiency characteristic value $\eta_{vgl}$, wherein a torque of the at least one rotary shaft of the at least one turbomachine stage is measured for establishing the actual efficiency characteristic value $\eta_{ist}$.

2. The method as claimed in claim 1, wherein a multistage turbomachine comprising at least one further turbomachine stage with at least one further rotary shaft is used as turbomachine.

3. The method as claimed in claim 2, further comprising:
   a') determining a further desired efficiency characteristic value $\eta_{soll}'$ of the at least one further turbomachine stage;
   b') establishing a further actual efficiency characteristic value $\eta_{ist}'$ of the at least one further turbomachine stage;
   c') establishing a further comparison efficiency characteristic value $\eta_{vgl}'$ of the at least one further turbomachine stage by comparing the further actual efficiency characteristic value $\eta_{ist}'$ and the further desired efficiency characteristic value $\eta_{soll}'$ to one another; and
   d') modifying at least one further operating parameter of the at least one further turbomachine stage in a manner dependent on the further comparison efficiency characteristic value $\eta_{vgl}'$.

4. The method as claimed in claim 3, wherein a further torque of the at least one further rotary shaft of the at least one further turbomachine stage is measured for establishing the further actual efficiency characteristic value $\eta_{ist}'$.

5. The method as claimed in claim 1, wherein a contactless measurement method is carried out for measuring the torque of the at least one rotary shaft and/or for measuring the further torque of the at least one further rotary shaft.

6. The method as claimed in claim 5, wherein the contactless measurement method is carried out with the aid of at least one magnetoelastic torque sensor.

7. The method as claimed in claim 6, wherein a compressor is used as turbomachine and an actual efficiency characteristic value $\eta_{ist}$ and/or a further actual efficiency characteristic value $\eta_{ist}'$ is/are used, which emerge from the following equation:

$\eta_i = P1_i/P2_i$, where $P1_i$=volumetric flow rate through the respective turbomachine stage i×pressure difference $\eta_i$ at the turbomachine stage i $P2_i$=torque at the rotary shaft of the turbomachine stage i×rotational speed of the rotary shaft of the turbomachine stage i.

8. The method as claimed in claim 1, wherein the turbomachine is selected from the group consisting of: gas turbine, steam turbine, turbocharger, pump, compressor, and hydroturbine.

9. The method as claimed in claim 1, wherein a volumetric flow rate of a fluid at the at least one turbomachine stage, with which fluid the turbomachine stage is operated, and/or a rotational speed, with which the at least one rotary shaft of the at least one turbomachine stage is driven, is/are used as operating parameter and/or as further operating parameter.

10. A turbomachine comprising at least one turbomachine stage with at least one rotary shaft, wherein the turbomachine comprises a device for carrying out the method as claimed claim 1.

11. The turbomachine as claimed in claim 10, wherein the turbomachine comprises at least one further turbomachine stage with at least one further rotary shaft.

12. The turbomachine as claimed in claim 11, wherein a torque sensor is arranged at the at least one rotary shaft for establishing the actual efficiency characteristic value $\eta_{ist}$ of the at least one turbomachine stage and/or a further torque sensor is arranged at the at least one further rotary shaft for establishing the further actual efficiency characteristic value $\eta_{ist}'$ of the at least one turbomachine stage.

13. The turbomachine as claimed in claim 12, wherein the torque sensor and/or the further torque sensor is/are a contactless torque sensor.

14. The turbomachine as claimed in claim 13, wherein the contactless torque sensor is a magnetoelastic torque sensor.

15. The turbomachine as claimed claim 10, wherein the turbomachine is selected from the group consisting of: gas turbine, steam turbine, turbocharger, pump, compressor and hydroturbine.

* * * * *